United States Patent [19]

White et al.

[11] Patent Number: 4,608,820
[45] Date of Patent: Sep. 2, 1986

[54] DUAL STEPPER MOTOR ACTUATOR FOR FUEL METERING VALVE

[75] Inventors: Albert H. White, Wethersfield; Robert E. Peck, Prospect; Gene A. Meyer, W. Simsbury; Raymond H. Devanney, Winsted, all of Conn.

[73] Assignee: Chandler Evans Inc., West Hartford, Conn.

[21] Appl. No.: 730,000

[22] Filed: May 3, 1985

[51] Int. Cl.$^4$ ............................................. F02C 9/46
[52] U.S. Cl. ........................... 60/39.281; 251/129.11; 251/249.5
[58] Field of Search .......... 60/39.281; 251/14, 129.01, 251/129.03, 129.08, 129.11, 248, 249.5

[56] References Cited

U.S. PATENT DOCUMENTS

| | | | |
|---|---|---|---|
| 3,820,323 | 6/1974 | Burnell et al. | 60/39.281 |
| 3,937,014 | 2/1976 | Plant | 60/39.281 |
| 4,077,203 | 3/1978 | Burnell | 60/39.281 |
| 4,154,425 | 5/1979 | Smith | 251/129.11 |
| 4,248,040 | 2/1981 | Kast | 60/39.281 |

*Primary Examiner*—Louis J. Casaregola
*Attorney, Agent, or Firm*—Radford W. Luther; Richard A. Dornon

[57] ABSTRACT

A fuel control for a gas turbine engine has an actuator (24) for a fuel metering valve (22) which includes two stepper motors (46 and 48) which selectively drive a differential mechanism operatively connected to the valve. The differential mechanism includes two identical gear assemblies (60, 64) which are mounted for rotation upon a shaft (26) connected to the valve. The gear assemblies include worm gears (58, 62) in engagement with worms (54, 56) driven by the stepper motors and bevel gears (68, 70). A spider bevel gear (66), carried by the shaft, is in meshing engagement with the bevel gears of the gear assemblies such that rotation of one of the gear assemblies with the other at rest causes a circumferential movement of the spider bevel gear which rotates the shaft and positions the valve. Two identical electronic control units (A, B), which each sense selected engine parameters are respectively connected to the stepper motors for controlling their operation. Only one of the electronic control units functions to control its stepper motor during normal operation while the positions worm and gear assembly associated with the other stepper motor remain frozen without any back-driving. Changeover to the other electronic control unit because of a malfunction or other reason may be effected by switching logic or operation of a selector switch (100).

4 Claims, 6 Drawing Figures

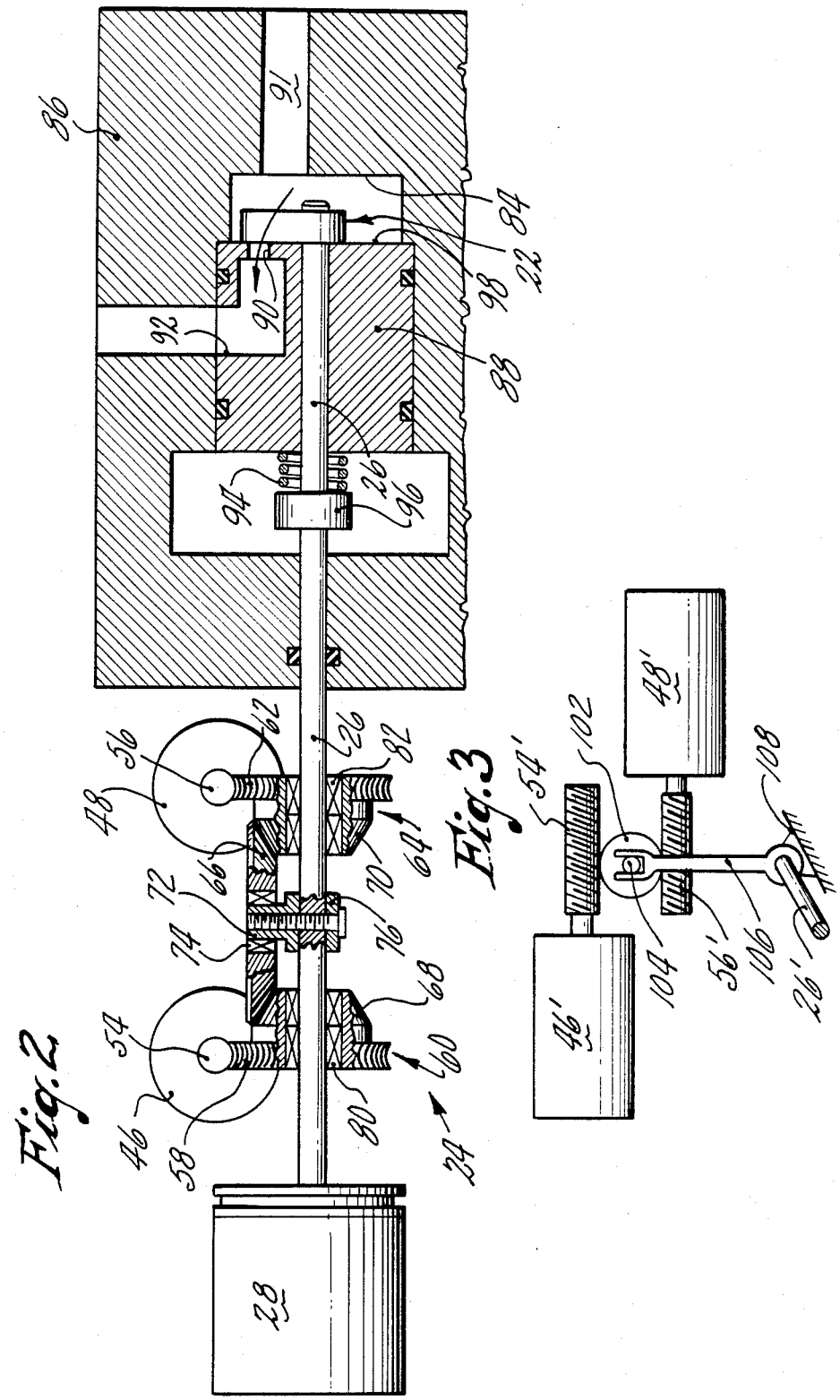

DUAL STEPPER MOTOR ACTUATOR FOR FUEL METERING VALVE

TECHNICAL FIELD

This invention relates to actuators for metering valves and, more particularly, to actuators for fuel metering valves in fuel controls for gas turbine engines.

BACKGROUND ART

Dual channel actuator controls for fuel metering valves are known in the prior art. In one such control arrangement, a rotary metering valve is enclosed within a valve sleeve whereby the relative angular position of the metering valve and the valve sleeve determines the flow area. The metering valve and the valve sleeve are each positioned by a separate motor such that a main control stepper motor positions the metering valve during normal fuel control operation with an electronic control unit computing the required metered flow. Metering valve position feedback to the electronic control unit is provided by a rotary transducer (e.g., a potentiometer). Upon failure of the electronic control unit the position of the metering valve is frozen and the valve sleeve is positionable by the other motor in response to manual inputs from an operator.

A fuel flow metering system as aforedescribed, while providing for alternative means of fuel metering, does not incorporate electronic control units in each control channel and hence cannot accomplish accurate metering of fuel flow in the event of a failure of the electronic control unit but instead is relegated to manual control of fuel flow with its attendant inaccuracies. Also, in such a system, sleeve and valve position must be known to accurately control fuel flow.

DISCLOSURE OF THE INVENTION

In accordance with the invention, there is provided a dual stepper motor actuator control for a fuel metering valve. Each stepper motor is operatively connected to a differential mechanism in such a manner that the non-operating motor is not backdriven by the operating motor. The differential mechanism is connected to the fuel metering valve such that the valve is positionable by operation of either stepper motor, thereby providing a fail operational drive.

Each stepper motor may be operated by a separate electronic control channel, i.e., a primary channel and a backup channel, with each channel preferably incorporating an electronic control unit embodying a digital microcomputer. Switchover between the control channels may be achieved by switching logic within the electronic control units or manual selection. Hence, seizure of one motor due, e.g., to a bearing failure, does not completely disable the control.

The invention provides a means for accurately metering fuel flow in the event of a failure of the primary stepper motor or a malfunction in the electronic control unit associated therewith. In addition, an actuator control according to the invention may conveniently embody an arrangement for manually positioning the fuel metering valve as an additional safeguard.

Accordingly, it is a primary object of the invention to provide an actuator for the fuel metering valve of a fuel control which incorporates a plurality of independently operable motors.

Another object is to provide an actuator for the fuel metering valve of a fuel control which is susceptible to selective control by redundant electronic channels.

These and further objects and advantages of the invention will become more readily apparent from the following detailed description when taken in conjunction with the accompanying drawings, in which:

BRIEF DESCRIPTION OF DRAWINGS

FIG. 2 is a more detailed view, partly in section, of the actuator of FIG. 1 together with its relationship to the metering valve.

FIG. 3 is a schematic view of another actuator of the invention.

BEST MODE OF CARRYING OUT THE INVENTION

Figure 1:
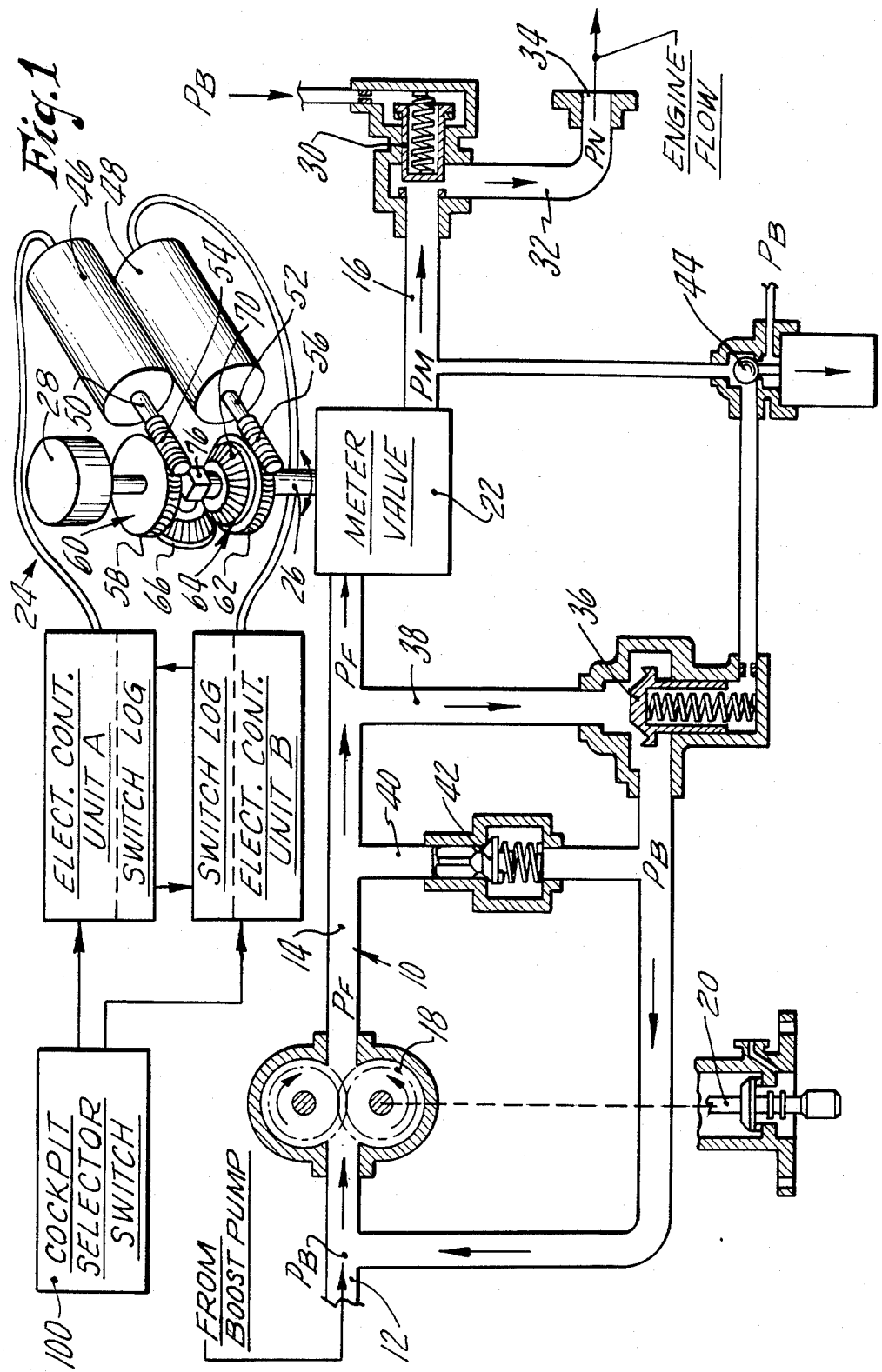
FIG. 1 is a schematic view of a fuel control for a gas turbine engine which embodies an actuator according to the invention.

Referring to the drawings, and more particularly to FIG. 1, there is shown a fuel control for a gas turbine engine. With the exception of the metering valve actuator and overspeed valve system, the fuel control depicted is generally conventional. The fuel control comprises a main fuel supply conduit generally designated 10 having conduit segments 12, 14 and 16. The various elements, including the conduit segments, which constitute the fuel control may be mounted in a plural cavity housing or separate housings.

Fuel from a tank (not shown) enters a centrifugal boost pump (not shown) and proceeds thence to a fuel filter (not shown). Fuel flow from the filter traverses conduit segment 12 to the inlet of a positive displacement pump, shown as gear pump 18. Gear pump 18 is driven by a shaft 20 connected to the engine gearbox. The discharge flow of the gear pump 18 enters conduit segment 14 and proceeds to a main fuel metering valve 22 which is of the sliding plate type. The metering area of the main fuel metering valve 22 is varied by an actuator, generally indicated at 24, controlled by either electronic control unit A or unit B which both sense the same selected engine parameters. The main fuel metering valve 22 has a rotatable positioning shaft 26 attached thereto which is connected to the actuator 24. Main fuel metering valve position feedback is furnished by a potentiometer (which is preferably a dual potentiometer) 28 connected to the shaft 26. Metered flow from the main fuel metering valve 22 enters conduit segment 16 and thence traverses a pressurizing valve 30 before entering outlet conduit 32 which communicates with a metered flow outlet 34. During overspeeds, valve 30 closes.

The pressure differential or metering head (PF-PM) across the metering valve 22 is maintained at a constant value by a metering head regulator 36 incorporated in a bypass conduit 38 which fluidly interconnects the discharge and inlet sides of the gear pump 18 and joins with conduit segments 12 and 14. The metering head regulator 36 will always bypass sufficient flow to maintain the aforementioned head at a constant value (e.g., 20 psi). Because of the constant head maintained thereacross, metered flow is purely a function of metering valve position. A pressure relief line 40 also fluidly interconnects the inlet and discharge sides of the gear pump 18 and incorporates a high pressure relief valve 42 adapted to crack at, for example, 800 psi. A solenoid operated ball valve 44 provides overspeed control by referencing regulator 36 to boost pressure $P_B$ during overspeeds.

With continued reference to FIG. 1, it will be seen that the actuator 24 includes two stepper motors 46 and 48 having respective output shafts 50 and 52 which carry worm threads thereby to define worms 54 and 56. The worm 54 engages the worm gear 58 of a first gear assembly 60 while the worm 56 engages the worm gear 62 of a second gear assembly 64. A spider bevel gear 66 interconnects the gear assemblies 60 and 64 to thereby define a differential mechanism.

The structural cooperative relationship between the gear assemblies 60 and 64, spider bevel gear 66 and shaft 26 can best be appreciated by reference to FIG. 2. Gear assembly 60 not only includes worm gear 58 but also embodies a bevel gear 68. Similarly, gear assembly 64, which is identical to gear assembly 60, embodies a bevel gear 70 disposed in confronting relationship to the bevel gear 68. While the gear assemblies would normally be of a fixedly connected multi-piece construction for manufacturing convenience, the assemblies could also be of one piece construction and such is illustrated in FIG. 2. The bevel gear is in meshing engagement with the bevel gears 68 and 70 and is circumferentially movable about the axis of the shaft 26. The bevel gear is mounted upon a shaft 72 by means of a bearing 74 for rotation about a circumferentially movable axis orthogional to that of the shaft 26. The shaft 72 extends from a cube-shaped base 76 which is fixedly attached to shaft 26 by means of a bolt 78 thereby resulting in a rotation of the shaft 26 (and hence metering valve positioning) in response to circumferential motion of the bevel gear 66.

As shown in FIG. 2, the gear assemblies 68 and 70 are mounted in fixed axial positions on the shaft 26 by means of respective bearings 80 and 82. Hence, it will be appreciated that the gear assemblies 68 and 70 are freely rotatable about the shaft 26. Since the valve 22 will only be positioned by one of the stepper motors 46 and 48, it is absolutely essential that the non-operating stepper motor and its associated gear assembly not be backdriven by operation of the operating stepper motor whereby the positions of the worm and gear assembly of the non-operating stepper motor are frozen. To this end, the thread form on the worm and tooth form on the worm gear should furnish approach action in either driving direction (where worm drives worm gear) and recess action in either opposite direction (where worm gear attempts to drive worm) such that a low coefficient of friction is encountered in either forward driving direction and a high coefficient of friction is encountered in either opposite backdrive direction. The efficiency of the worm drive plus the mechanical load in either opposite backdrive direction should, of course, be zero or less and thereby not allow backdrive. Opposite rotation can also be prevented by energizing the non-operating stepper motor.

Since the output of the actuator 24 is basically a rotary motion, metering valve 22 is preferably of the sliding plate variety as illustrated in FIG. 2. Metering valve 22 is contained within a cavity 84 of housing 86, together with a fuel metering cartridge 88 which has a metering orifice 90 in communication with an inlet 91 and an outlet 92. The position of metering valve 22, which determines the effective area of metering orifice 90 is controlled by the rotatable shaft 26 which extends through the metering cartridge 88. A spring 94 seated against a land 96 on shaft 26 urges the valve 22 into an abutting relationship with the front face 98 of the fuel metering cartridge 88 in a fluid sealing manner.

Each Electronic Control Unit (ECU) contains all input/output signal processing circuits, digital microcomputer, analog overspeed detector, power supplies, etc., needed to provide the required control functions. For integrity of control, ECU A and ECU B provide two identical redundant channels. Obviously, it is preferable to have the more critical engine sensors duplicated to provide dedicated input signals for both channels, while less vital signals may be shared between channels. In all cases, however, the signals should be separately wired to the two channels for reliable operation.

A cockpit selector switch 100 functions to designate which primary channel will control the engine until a fault is detected. Dependent upon the type of fault, control may remain with the primary channel or it may be switched to the backup channel via switching logic in the primary ECU or switch 100. The primary channel should retain control for external faults such as loss of an engine sensor, with backup sensor data being received from the second channel via means such as a serial data link. For more critical faults, the primary channel will be inhibited and control switched to the backup. Where the primary channel is still functional, it may, if desired, provide backup data to the second channel for further fault correction capability.

As to hardware design, it is desirable to have both channels housed in a single, environmentally sealed, cast aluminum enclosure. For reliability, the housing should be compartmentalized to provide maximum isolation between channels, the only interconnections being via the serial data link. Signals should also be brought into the two channels via separate connectors. Where signals are shared between channels, high impedance input circuits should be employed to provide isolation in order to minimize the possibility of a fault in one channel compromising the signal to the other.

While each channel of the electronic control is capable of controlling the engine over its full operating range, the primary channel is normally in control except when a serious fault develops. The backup channel is then commanded to begin controlling the engine. Automatic fault detection and correction is incorporated into each channel, assuring controlled failure modes. Examples of techniques which may be used are:
1. Check that input signals are in normal range;
2. Rate of change checks on input signals (program cycle to program cycle);
3. Reference voltage checks in the analog-to-digital converter which converts input signals to digital words;
4. Comparison of stepper motor step count and potentiometer feedback;
5. Check program cycle completion with watchdog timer; and
6. Memory check - ROM checksum; and RAM read/write.

Most fault detection routines should include counters so that a fault must persist for a predetermined number of program cycles before final action is taken. This feature will prevent inadvertant tripping due to a single noise transient and gives the operating ECU channel maximum opportunity to correct itself before taking appropriate failure action. However, to ensure that the stepper motor does not respond to an erroneous command during the fault verification sequence, the following precautions would normally be recommended:

1. The last correct value on input signal should be used; i.e., engine speed, compressor discharge pressure, and temperature; and
2. Stepper motor position should be frozen if the program ever gets hung up. Successive attempts at recycling through the program should be made, and if successful, the motor should be released.

In addition, the metering valve (potentiometer) feedback should be continuously compared to a value of fuel flow based on the cumulative step count. If more than a predetermined error is present at any time, the stepper motor should be frozen and switchover to the backup channel effected.

When serious faults in the primary channel occur, primary channel operation must be inhibited (e.g., loss of engine speed signals to ECU A when this is the primary channel). Switchover to the backup channel (ECU B in this case) is achieved by first inhibiting the drive signals to the stepper motor 46 controlled by ECU A so that the value of fuel flow existing just before the fault was detected, remains fixed. A signal is then sent to ECU B to allow it to take over control of the engine. Other types of failures which would cause a switchover to the backup channel include failure of the CPU (Central Processing Unit), which would be detected by the watchdog timer, and loss of electrical power.

Figure 5:
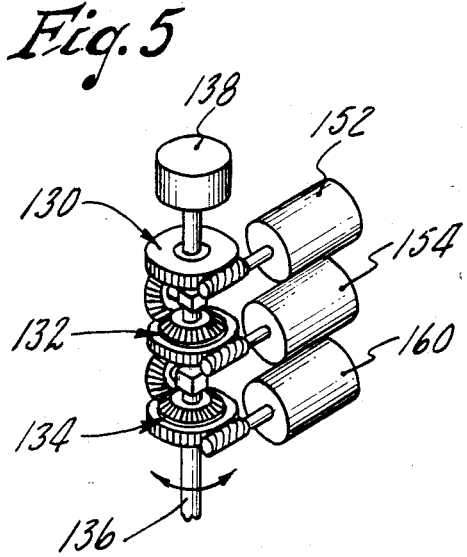
FIG. 5 is a perspective view of a still further actuator of the invention.
Figure 6:
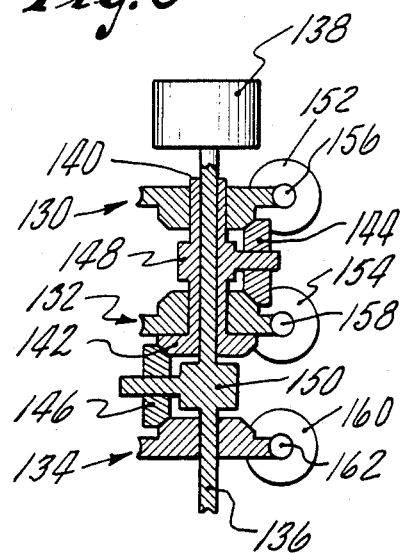
FIG. 6 is a sectional view of the actuator of FIG. 5.

Major faults which result in the backup channel no longer having the capability of controlling the engine include the same types of failures which are classified as major faults in the primary channel plus failure of dedicated engine sensors. In such a situation, manual control of the fuel metering valve 22 must be initiated. The embodiment of FIGS. 5 and 6 provides for such manual control in the event of both channels being rendered inoperative as is discussed hereinafter.

For less serious failures such as loss of a dedicated input signal, control of the engine remains with the primary channel and data is obtained from the corresponding sensor in the backup channel via the serial data link. For relatively minor failures involving loss of a shared input signal, control of the engine remains with the primary channel and the failure action would be to substitute a nominal or computed value for a parameter, disable a function, etc. The performance of the engine may deteriorate slightly when such a failure occurs. Only loss of shared input signals are classified as minor failures in the backup channel when it is operating. Losses of dedicated engine sensors are not to be categorized as minor because the integrity of the data supplied by the primary channel via the serial data link is suspect due to the malfunctioning of the primary channel.

During operation, the selected ECU will furnish four discrete output signals to control the phases of the associated stepper motor. Each signal drives power MOSFETs which switch the current to the winding. The stepper motor is driven to the required position by energizing the four phases in a predetermined sequence. The motor will slew only if the phases are excited in the proper sequence. This makes the possibility of a runaway failure very remote. Conversely, runaway failures are a common failure mode problem in systems that use torque motor or solenoid-operated metering valves.

Assuming ECU A is operating and constitutes the primary electronic control channel, ECU A will drive stepper motor 46 with stepper motor 48 remaining at rest. ECU A senses selected engine parameters (e.g., speed, compressor discharge pressure, temperature, etc.) and generates output signals indicative of a commanded fuel flow. The output signals from ECU A result in slewing movement (rotation) of the worm 54 of stepper motor 46. Rotation of the worm 54 results in a consequential rotation of the entire gear assembly 60 by virtue of the engagement between worm 54 and worm gear 58. Since ECU B is not furnishing output signals when ECU A is operating, the worm 56 of stepper motor 48 and its associated gear assembly 64 have their positions frozen. This results in a circumferential movement of spider bevel gear 66 due to its engagement with bevel gear 68 of gear assembly 60. During this circumferential movement, the spider bevel gear rolls over the stationary bevel gear 70 of gear assembly 64 and simultaneously begets a rotation of the shaft 26, thereby positioning metering valve 22. Metering valve position information is continuously provided to ECU A by the potentiometer 28 at all times.

Assuming a switchover from ECU A to ECU B as might be automatically occasioned by a malfunction in ECU A or simply actuation of the cockpit selector switch, the metering valve 22 is now being positioned by signals from ECU B. Worm 54 and gear assembly 60 now occupy fixed positions and are frozen in place. When ECU B drives stepper 48, worm 56 rotates, thereby producing a rotation of gear assembly 64 owing to the engagement between the worm 56 and the worm gear 62. Rotation of gear assembly 62 causes a circumferential movement of the spider bevel gear 66 as it rolls over stationary bevel gear 68 and a consequential rotation of the shaft 26. The fuel flow to the engine is now accurately being controlled by ECU B which receives as inputs the same engine parameters applied to ECU A as well as fuel metering valve position.

The embodiment of FIG. 3 functions in a manner identical to that of FIG. 1 but incorporates a different form of differential mechanism. As shown in FIG. 3, two stepper motors 46' and 48' have their respective worms 54' and 56' in engagement with a laterally movable worm gear 102. Worm gear 102 has a pin 104 projecting from its center which receives the end of a crank arm 106. Crank arm 106 has its other end pivotally mounted upon a base 108 and fixedly secured to a shaft 26' adapted to be connected to a fuel metering valve. Energizing either of the stepper motors 46' and 48' results in the worm gear 102 being laterally displaced and rolling over (and not backdriving) the inoperative worm. Lateral displacement of the worm gear 102 causes the arm 106 to pivot and hence, produces a corresponding rotation of the shaft 26'.

Figure 4:
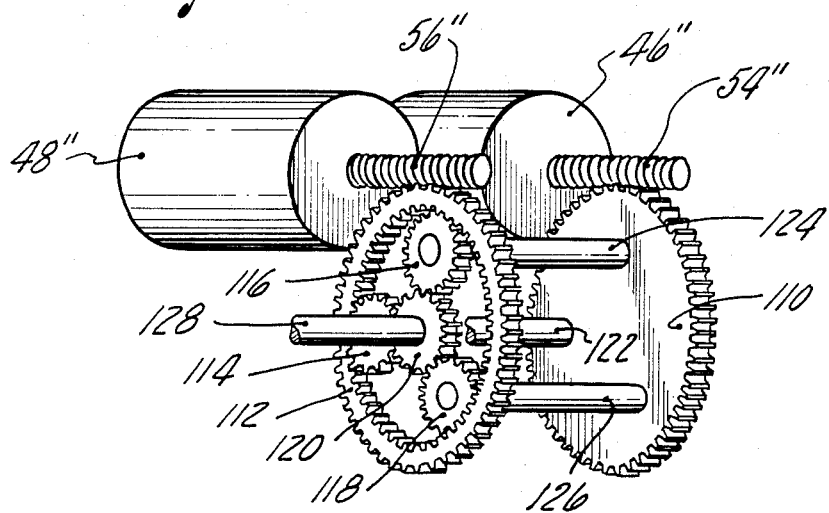
FIG. 4 is a perspective view of a further actuator of the invention.

The embodiment of FIG. 4 reflects another variation where stepper motors 46'' and 48'' have their respective worms 54'' and 56'' in engagement with worm gears 110 and 112. Worm gear 112 is formed as a ring gear with internal and external teeth. The internal teeth mesh with three planetary gears 114, 116 and 118 which, in turn, mesh with a sun gear 120. The planetary gears, whose centers form an equilateral triangle, are rotatably mounted upon shafts 122, 124 and 126 are secured to the worm gear 110 and extend laterally therefrom. The sun gear 120 is fixedly secured to a shaft 128 which is connected to a fuel metering valve. With motor 48'' operating and motor 46'' at rest, worm gear 112 rotates, thereby causing the planetary gears 114, 116 and 118 to rotate about the fixedly positioned shafts 122, 124 and 126 which produces rotation of the sun gear and shaft 128. Conversely, with motor 46" operating and motor 48" at rest, the planetary gears are constrained to travel along the inner periphery of the worm gear 112, thereby rotating the sun gear 120 and the shaft 128. It will, of course, be appreciated that the gear ratios of worms 54" and 56" are at variance.

The embodiment of FIGS. 5 and 6, while similar to that of FIG. 1, offers an additional advantage in that it permits manual positioning of the fuel metering valve. In the embodiment of FIGS. 5 and 6, there are three gear assemblies 130, 132, and 134, each one being similar in construction to those of FIG. 1 in that each includes a worm gear and bevel gear and is freely rotatable about a shaft. A shaft 136, adapted to be connected to a fuel metering valve, has its upper end connected to a feedback potentiometer 138. An enlarged diameter shaft 140 is mounted upon the shaft 136 in coaxial relationship therewith for rotation with respect thereto. Integral with the lower end of the shaft 140 is a bevel gear 142 which is in confronting spaced relationship to the bevel gear of the gear assembly 134. Gear assemblies 130 and 132 are mounted for rotation in spaced confronting relation upon upper and lower stations of the shaft 140 in a manner similar to that depicted in FIG. 2 while the gear assembly 134 is mounted for rotation upon the shaft 136. Spider bevel gears 144 and 146 are respectively mounted upon shafts which extend from cube-shaped bases 148 and 150 on the shafts 140 and 136 and are in meshing engagement with the two sets of confronting bevel gears.

In order to effect dual channel electronic control stepper motors 152 and 154 have respective worms 156 and 158 in engagement with the respective worm gears of gear assemblies 130 and 132. A D.C. motor and gearhead 160 has an output worm 162 in engagement with the worm gear of gear assembly 134. The D.C. motor 160 has an independent power supply and may be controlled directly by an operator through the use of switches or the like whereas the stepper motors 152 and 154 are each controlled by separate ECU's.

It should be readily apparent that operation of either stepper motor 152 or 154 will result in circumferential movement of the spider bevel gear 144. Such movement of the spider bevel gear 144 causes shaft 140 to rotate in unison with bevel gear 142, thereby producing a circumferential movement of spider bevel gear 146 and a rotation of the shaft 136. During operation of either stepper motor 152 or 154 the gear assembly associated with the non-operating stepper and the gear assembly 134 remain fixed in place. In the manual control mode with D.C. motor 160 running, gear assembly 134 rotates, thereby engendering a circumferential movement of the spider bevel gear 146 and a rotation of the shaft 136. It will be noted that in the manual control mode the position of the shaft 140, and hence the position of the bevel gear 142, remains fixed.

Obviously many variations and modifications are possible in light of the above teachings without departing from the scope or spirit of the invention as defined in the appended claims. For example, it is within the ambit of the invention to employ only one automatically controlled motor. In addition, the number of automatically controlled motors need not be limited to two. Moreover, worm and end gears could be replaced by spur gears if the non-operating stepper motor furnished sufficient holding torque as would be occasioned by energizing one or more of its windings.

We claim:

1. In an engine fuel control of the type having: a fuel metering valve; a first stepper motor; means, comprising a differential mechanism, operatively interconnecting the fuel metering valve and the first stepper motor for positioning the fuel metering valve in response to operation of the first stepper motor; an electronic control unit adapted to sense a plurality of engine parameters operatively connected to the first stepper motor for controlling the first stepper motor; a second stepper motor operatively connected to the differential mechanism such that operation of the second stepper motor functions to position operating; and means to control the second stepper motor, the improvement comprising:

the second stepper motor control means comprising another electronic control unit adapted to sense a plurality of engine parameters operatively connected to the second stepper motor for controlling the second stepper motor; and the improvement further comprising:

a manually operable motor connected to the differential mechanism such that operation of the manually operable motor functions to position the fuel metering valve when both of the stepper motors are not operating.

2. In an engine fuel control of the type having: a fuel metering valve; a first stepper motor; means, comprising a differential mechanism, operatively interconnecting the fuel metering valve and the first stepper motor for positioning the fuel metering valve in response to operation of the first stepper motor; an electronic control unit adapted to sense a plurality of engine parameters operatively connected to the first stepper motor for controlling the first stepper motor; a second stepper motor operatively connected to the differential mechanism such the operation of the second stepper motor functions to position the fuel metering valve when the first stepper motor is not operating; and means to control the second stepper motor, the improvement comprising:

the second stepper motor control means comprising another electronic control unit adapted to sense a plurality of engine parameters operatively connected to the second stepper motor for comprising:

a rotatable shaft connected to the fuel metering valve;

first and second gear assemblies mounted for rotation in spaced axial relationship about the shaft and in coaxial relationship to the shaft, each gear assembly incorporating a worm gear and a bevel gear such that the bevel gears are in confrontining relationship;

a spider bevel gear engaged with the bevel gears of the first and second gear assemblies, the spider bevel gear being connected to the rotatable shaft such that circumferential movement thereof produces a rotation of the rotatable shaft; and two worms respectively driven by the stepper motors in respective engagement with the worm gears of the first and second gear assemblies.

3. The improvement of claim 1, wherein the differential mechanism comprises:

a rotatable shaft connected to the fuel metering valve;

first, second and third gear assemblies mounted for rotation in spaced axial relationship about the shaft and in coaxial relationship to the shaft; each gear assembly incorporating a worm gear and a bevel gear;

a first spider bevel gear in engagement with the first and second gear assemblies;

a second spider bevel gear in engagement with the third gear assembly, the second spider bevel gear being connected to the rotatable shaft such that circumferential movements thereof produces a rotation of the rotatable shaft; and three worms respectively driven by the stepper motors and the manually operable motor and in respective engagement with the worm gears of the first, second and third gear assemblies.

4. The improvement of claim 1, wherein the fuel metering is of the sliding plate variety.

* * * * *